(12) United States Patent
Zabar

(10) Patent No.: US 7,819,642 B2
(45) Date of Patent: Oct. 26, 2010

(54) RECIPROCATORY FLUID PUMP

(75) Inventor: Nachum Zabar, Ganei Tikva (IL)

(73) Assignee: N.A.H. Zabar Ltd., Ganei Tikva (IL)

( * ) Notice: Subject to any disclaimer, the term of this patent is extended or adjusted under 35 U.S.C. 154(b) by 724 days.

(21) Appl. No.: 11/509,041

(22) Filed: Aug. 24, 2006

(65) Prior Publication Data

US 2008/0050251 A1 Feb. 28, 2008

(51) Int. Cl.
*F04B 17/03* (2006.01)
(52) U.S. Cl. .................................. 417/413.1
(58) Field of Classification Search ............... 417/413.1
See application file for complete search history.

(56) References Cited

U.S. PATENT DOCUMENTS

| 2,169,827 | A | * | 8/1939 | Whitted | 417/413.1 |
| 2,605,042 | A | * | 7/1952 | Reutter | 417/338 |
| 4,154,559 | A | | 5/1979 | Enomoto | |
| 4,169,234 | A | * | 9/1979 | Yonkers | 310/29 |
| 4,859,152 | A | | 8/1989 | Kimura et al. | |
| 5,201,641 | A | * | 4/1993 | Richer | 417/417 |
| 6,514,047 | B2 | * | 2/2003 | Burr et al. | 417/53 |
| 6,533,560 | B2 | * | 3/2003 | Ohya et al. | 417/431 |
| 6,652,252 | B2 | * | 11/2003 | Zabar | 417/417 |
| 2004/0234377 | A1 | * | 11/2004 | Bolt | 417/44.1 |

* cited by examiner

*Primary Examiner*—Devon C Kramer
*Assistant Examiner*—Bryan Lettman

(57) ABSTRACT

A reciprocatory fluid pump includes an armature assembly which is reciprocatably mounted to the housing by a pair of spaced leaf springs extending parallel to each other and fixed at their opposite ends to the armature assembly and housing, respectively, so as to define therewith a four-sided parallelogram in which the pair of leaf springs serve as two parallel sides, and the armature assembly and housing, respectively, serve as the other two parallel sides. The leaf springs are of flat rectangular configuration constraining the reciprocatory movement of the armature assembly to longitudinal displacement with a small transverse displacement. The housing includes a base, and the pair of leaf springs are secured at one of their ends to the base such as to reduce sounds and vibrations during the operation of the pump. Several embodiments are described in which the pumping member is a diaphragm, a pair of diaphragms, and a piston, respectively.

14 Claims, 4 Drawing Sheets

RECIPROCATORY FLUID PUMP

FIELD AND BACKGROUND OF THE INVENTION

The present invention relates to reciprocatory fluid pumps, and particularly to electromagnetic reciprocatory pumps widely used for low-pressure applications.

A large number of reciprocatory fluid pumps have been developed for low-pressure applications. They generally include a housing; an electromagnet fixed within the housing and defining an air gap; an armature assembly, sometimes called a plunger assembly or actuator, extending through the air gap and magnetically coupled to the electromagnet so as to be reciprocated thereby during the energization of the electromagnet; a pumping member, such as a diaphragm or a piston, mechanically coupled to the armature assembly so as to be reciprocated thereby; and a valve assembly cooperable with the pumping member, the valve assembly having an inlet port through which fluid is inletted and an outlet port through which fluid is outletted upon the reciprocation of the pumping member.

The known reciprocatory fluid pumps of this type generally include two pumping members, e.g., diaphragms, at its opposite ends, driven by two electromagnets. Other designs have been proposed including a single electromagnet driving two pumping members, e.g. diaphragms. Examples of such prior art pumps are described in U.S. Pat. Nos. 4,859,152 and 4,154,559.

The known reciprocatory fluid pumps of this type, however, are generally bulky, heavy and relatively expensive. In addition, the known reciprocatory fluid pumps generate considerable sound and vibration, as compared to rotary fluid pumps.

OBJECT AND BRIEF SUMMARY OF THE PRESENT INVENTION

An object of the present invention is to provide a reciprocatory fluid pump having advantages in one or more of the above respects.

According to one aspect of the present invention, there is provided a reciprocatory fluid pump comprising a housing; an electromagnet fixed within the housing and defining an air gap; an armature assembly extending through the air gap and magnetically coupled to the electromagnet so as to be reciprocated thereby during the energization thereof; a pumping member mechanically coupled to the armature assembly so as to be reciprocated thereby; and a valve assembly cooperable with the pumping member, the valve assembly having an inlet port through which fluid is inletted, and an outlet port through which fluid is outletted upon the reciprocation of the pumping member; characterized in that the armature assembly includes a ferromagnetic member and a pair of spaced permanent magnets mounted thereon for reciprocation by the electromagnet, the permanent magnets being aligned with a the air gap of the electromagnet in the non-energized condition of the pump; and in that the armature assembly is reciprocatably mounted to the housing by a pair of spaced leaf springs extending parallel to each other and fixed at their opposite ends to the armature assembly and housing, respectively, so as to define therewith a four-sided parallelogram in which the pair of leaf springs serve as two parallel sides, and the armature assembly and housing, respectively, serve as the other two parallel sides during reciprocations of the armature assembly.

According to a particularly important feature in the preferred embodiments of the invention described below, the leaf springs are of flat rectangular configuration constraining the reciprocatory movement of the armature assembly to longitudinal displacement with a small transverse displacement.

As will be described more particularly below, reciprocatory fluid pumps can be constructed in accordance with the foregoing features having a high degree of efficiency and a relatively compact construction which can be produced in volume and at relatively low cost.

According to a feature in the described preferred embodiments, the housing includes a base, and the pair of leaf springs are secured at one of their ends to the base such as to reduce sounds and vibrations during the operation of the pump.

Several embodiments of the invention are described below for purposes of example. In one embodiment, the pumping member is a diaphragm; in a second embodiment, the pumping member is a piston; and in a third embodiment, a pumping member and a valve assembly are provided at each of the opposite ends of the pump.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

Figure 1:
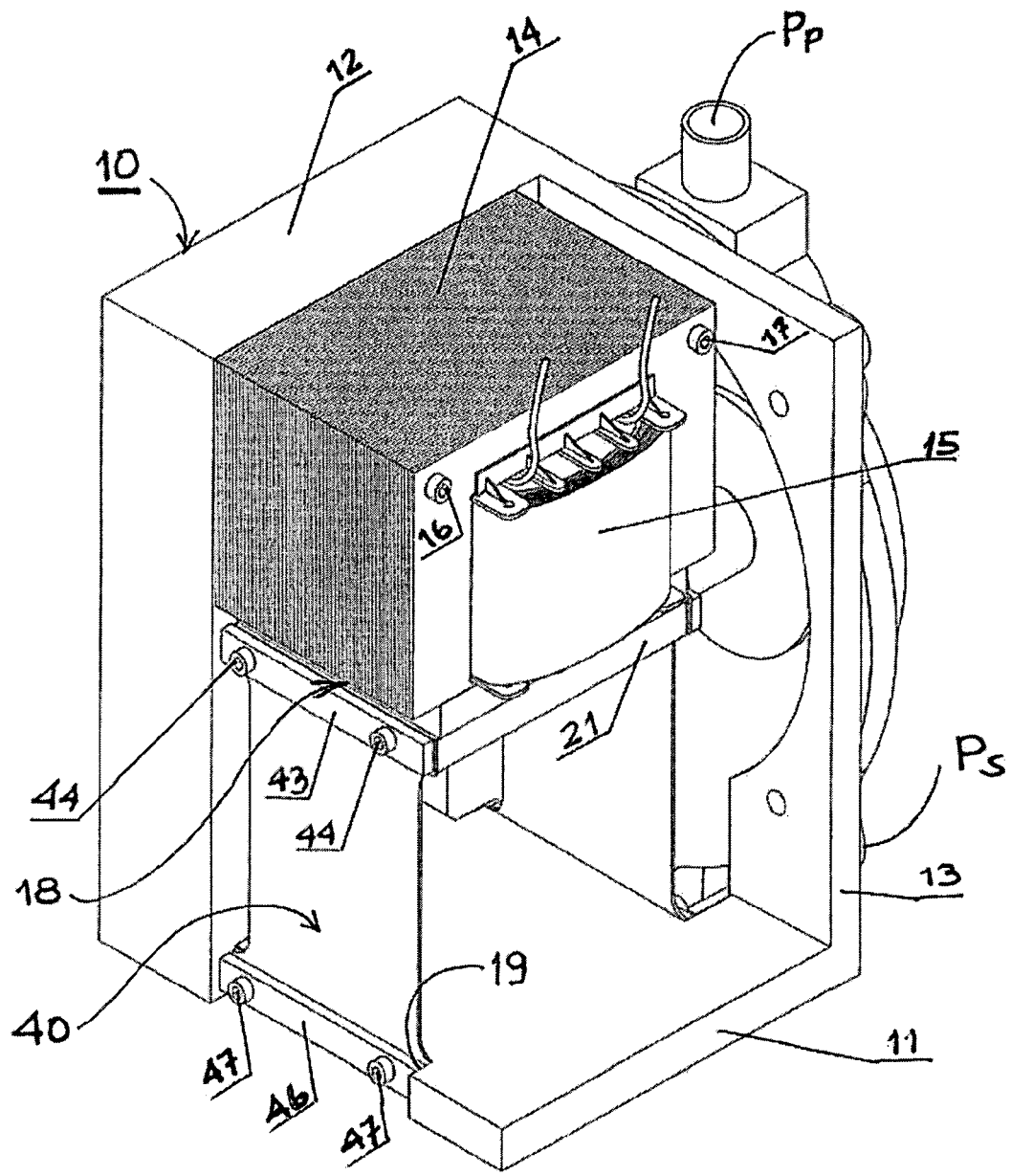
FIG. 1 is a three-dimensional view illustrating one form of reciprocatory fluid pump constructed in accordance with the present invention.
Figure 2:
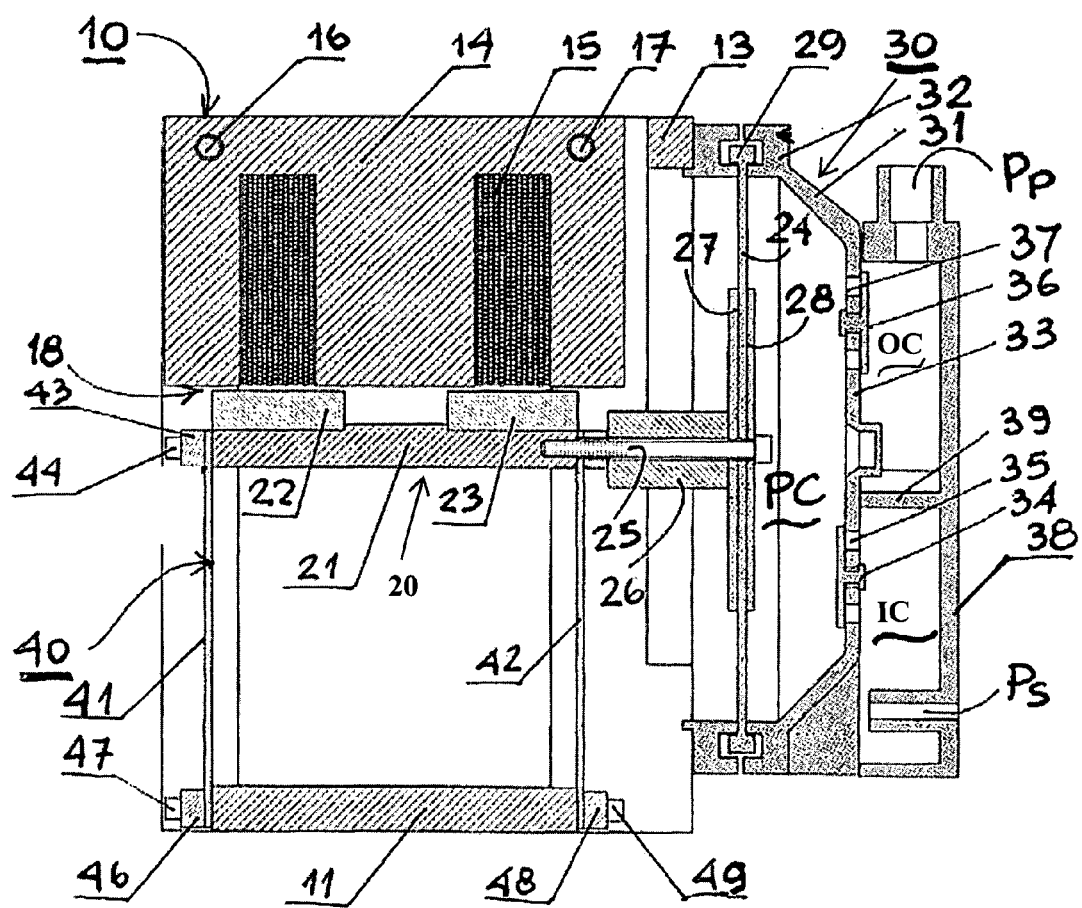
FIG. 2 is a longitudinal sectional view of the pump of FIG. 1.
Figure 3:
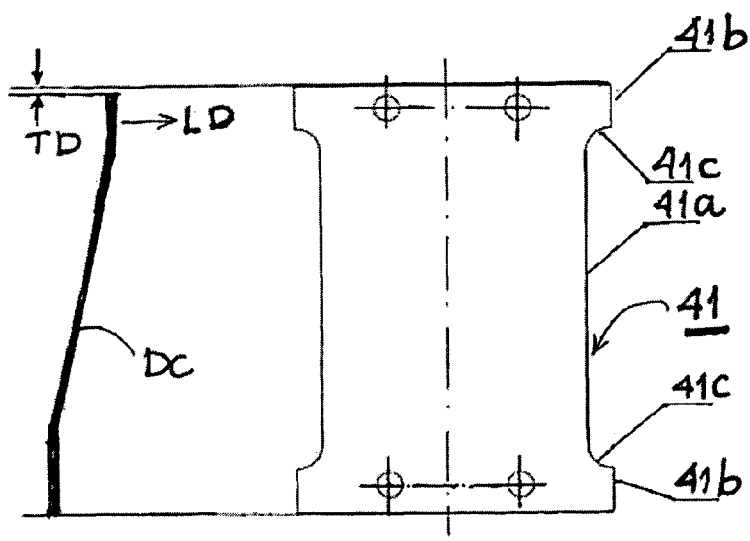
FIG. 3 illustrates one of the two leaf springs for mounting the armature assembly in the pump of FIG. 1.

The Embodiment of FIGS. 1-3

As shown in FIGS. 1 and 2, the reciprocatory fluid pump of this embodiment includes a housing, generally designated 10, comprising a base 11, and two side walls 12, 13 extending upwardly from the base and perpendicularly to it and to each other. An electromagnet 14 including a coil 15 is mounted in the upper end of housing 10 by a pair of bolts 16, 17 passing therethrough and through sidewall 12, such that the lower end of the electromagnet defines an air gap 18. One side of base 11 is formed with a recess 19 (FIG. 1) for use in mounting an armature assembly, generally designated 20. Armature assembly 20 which extends through air gap 18 and is magnetically coupled to the electromagnet 14 so as to be reciprocated thereby during the energization of the electromagnet.

Armature assembly 20 includes a ferromagnetic member 21 and a pair of permanent magnets, 22, 23 (FIG. 2) mounted thereon for reciprocation by the electromagnet. One end of ferromagnetic member 21 is coupled to the center of a diaphragm 24 by a coupling rod 25. Coupling rod 25 passes through a tubular spacer member 26 and a pair of circular discs 27, 28 secured to opposite sides of the central region of diaphragm 24.

Diaphragm 24 is of circular configuration. Its outer periphery is formed with a circular bead 29 engaged by a valve assembly, generally designated 30, secured to sidewall 13 of housing 10.

Thus, as shown particularly in FIG. 2, valve assembly 30 includes a housing 31 formed with a peripheral groove 32 receiving bead 29 of diaphragm 24. Valve assembly 30 further includes a valve plate 33 spaced from diaphragm 24 and defining a pumping chamber PC therewith. Valve plate 33 carries an umbrella valve member 34 permitting the inflow of fluid from an inlet chamber IC via inlet openings 35, and another umbrella valve member 36 permitting outflow of fluid to outlet chamber OC via outlet valve openings 37.

Outlet chamber OC includes an outer wall 38 formed with a partition 39. Outer wall 38 is further formed with a suction inlet port $P_S$ communicating with the side of outlet chamber OC having the inlet openings 35, and with a pressure port $P_P$ communicating with the opposite side of chamber OC having the exit openings 37.

It will thus be seen that as diaphragm 24 is reciprocated back and forth by armature assembly 20, fluid is drawn into pumping chamber PC via suction port $P_S$ and inlet openings 35, and pressurized fluid is pumped out of pumping chamber PC via exit openings 37 and pressure port $P_P$.

Armature assembly 20 is reciprocatably mounted within air gap 18 of electromagnet 14 by a mounting assembly 40 including a pair of spaced leaf springs 41, 42. Leaf springs 41, 42 extend parallel to each other and perpendicularly to armature assembly 20 at one end, and to base 11 of housing 10 at the opposite ends. Thus, the upper end of the outer leaf spring 41 is secured to one side of ferromagnetic member 21 of armature assembly 20 by a clamping bar 43 and a pair of bolts 44, whereas the upper end of the inner leaf spring 42 is secured to the opposite side of ferromagnetic member 21 in the same manner. The lower ends of the two leaf springs 41, 42 are secured to the opposite sides of base 11 of housing 10 by a locking bar 46 in recess 19 and receiving bolts 47, and a locking bar 48 receiving bolts 49.

It will thus be seen that the pair of spaced leaf springs 41, 42 define a four-sided parallelogram in which the pair of leaf springs serve as two parallel sides, ferromagnetic member 21 of armature assembly 20 serves as the third side, and base 11 of housing 10 serves as the fourth side opposite and parallel to the third side. It will further be seen that the two leaf springs 41, 42 are of a flat rectangular configuration constraining the reciprocatory movements of the armature assembly 20 to longitudinal displacement with a small transverse displacements at the ends of the longitudinal displacements.

The latter is more particularly illustrated in FIG. 3, showing the outer leaf spring 41, it being appreciated that the inner leaf spring 42 is of the same construction but includes a central hole for coupling rod 25. Thus, as seen in FIG. 3, leaf spring 41 includes a main section 41a of a flat, rectangular configuration, and outer marginal regions 41b of slightly larger width than sections 41a and joined to the latter sections by curved transitions 41c. The outer enlarged regions 41b are adapted to receive the clamping bars 43 and 46, respectively, and are formed with openings for receiving the fastening bolts 44 and 47, respectively.

FIG. 3 further shows the displacement curve DC produced during the reciprocatory movements of leaf spring 41. It will be seen that the main displacement is a longitudinal displacement LD, but includes a small transverse displacement TD at its opposite ends, the latter being caused by the bending of the leaf springs.

The operation of the reciprocatory fluid pump illustrated in FIGS. 1-3 will be apparent from the above description. Thus, when alternating current is applied to electromagnet 14, the magnetic attraction and repellant forces applied by the electromagnet to the two permanent magnets 22, 23 reciprocate armature assembly 20 at the frequency of the power supplied to the electromagnet. These reciprocations of armature assembly 20 are permitted by leaf springs 41, 42, which, because of the parallelogram arrangement defined by the two leaf springs with ferromagnetic member 21 on one side, and with base 11 on the opposite, constrain the reciprocations to longitudinal displacements, but with a small transverse displacement at the ends, as shown in FIG. 3. The reciprocations of armature assembly 20 are transferred by coupling rod 25 to diaphragm 24. The reciprocations of diaphragm 24 change the volume within pumping chamber PC, thereby sucking fluid into the pumping chamber via suction inlet port $P_S$ and valve inlet openings 35, and pumping fluid out of the pumping chamber via valve outlet openings 37 and pressure port $P_P$.

Figure 4:
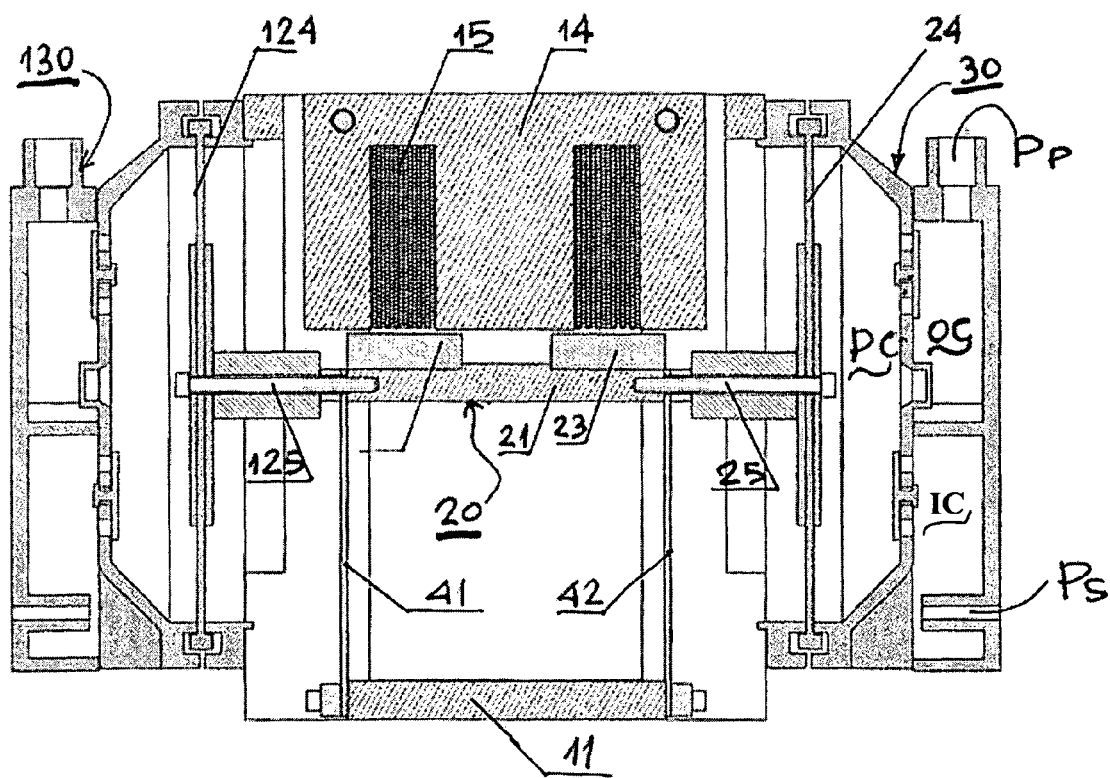
FIG. 4 is a longitudinal sectional view illustrating a two-diaphragm pump constructed in accordance with the present invention.

The Two-Diaphragm Pump of FIG. 4

FIG. 4 illustrates a reciprocatory fluid pump of generally the same construction as described above with respect to FIGS. 1-3, except that it includes a second diaphragm cooperable with a second valve assembly at the opposite end of the reciprocatory armature assembly 20. For purposes of conciseness, those parts in FIG. 4 which correspond to the parts in FIGS. 1-3 are identified with the same reference numerals, whereas the new parts involved in adding the second diaphragm are identified by corresponding reference numerals but increased by "100".

Thus, as shown in FIG. 4, a second diaphragm 124 and a second valve assembly 130 are coupled to armature assembly 20 by coupling rod 125, such that during one-half cycle of operation of the pump, fluid pressure is outletted via pressure port $P_P$ on one side (right side), and during the next half-cycle fluid pressure is outletted via the pressure port $P_P$ on the opposite site (left side). Thus, the two-diaphragm pump illustrated in FIG. 4 substantially increases the output of the pump with a relatively small increase in size, weight and expense, since it uses but a single electromagnet.

Figure 5:
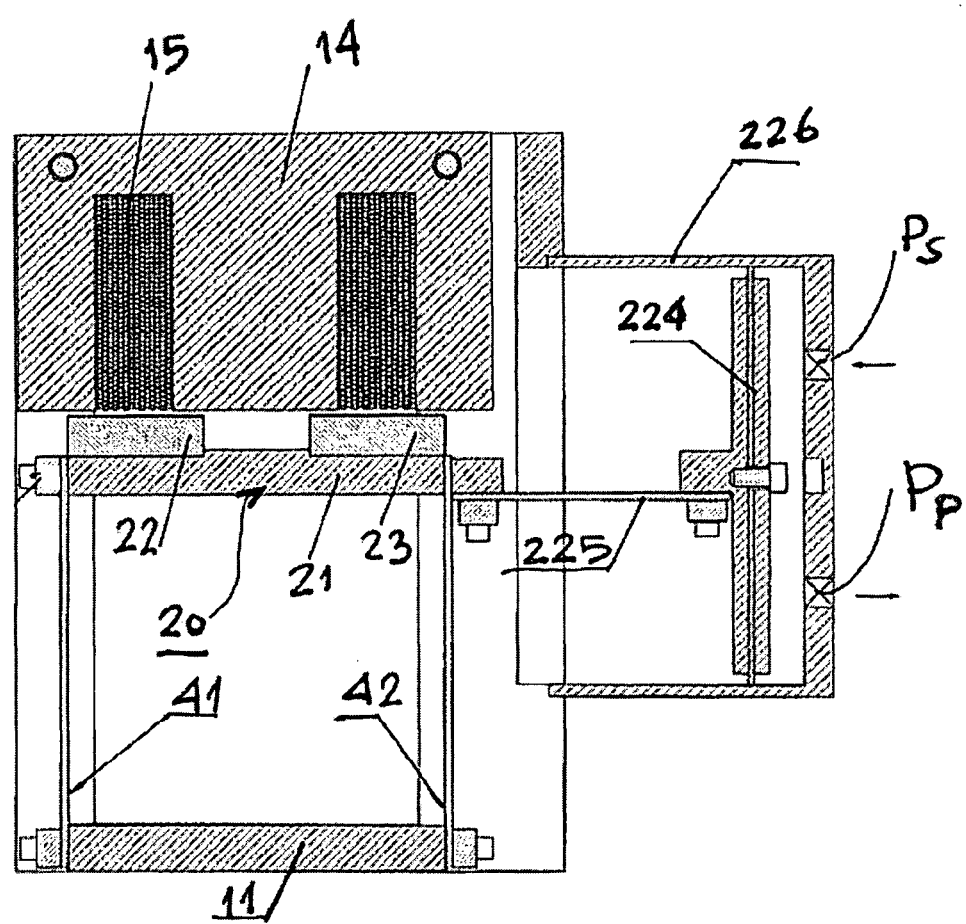
FIG. 5 is a longitudinal sectional view illustrating a piston pump constructed in accordance with the present invention.

The Piston Pump Illustrated in FIG. 5

FIG. 5 illustrates a reciprocatory fluid pump constructed and operating substantially as described above with respect to FIGS. 1-3, except that the pumping member is a piston moveable within a cylinder, rather than a diaphragm. For purposes of conciseness, those parts of the pump of FIG. 5 generally corresponding to those described above in FIGS. 1-3 are identified by the same reference numerals, whereas the piston used as a pumping member is identified by the reference numeral 224, its coupling to the reciprocatory armature assembly 20 is identified by the reference number 225, and the cylinder within which the piston moves is identified by the reference numeral 226.

The piston implementation illustrated in FIG. 5 is otherwise constructed, and otherwise operates in substantially the same manner, as described above with respect to FIGS. 1-3, except that since cylinder 226 constrains the movement of piston 224 to strictly longitudinal displacements, coupling member 225 is a stiff member, as described above with respect to FIGS. 1-3, except that it has some elasticity permitting some transverse displacement of the piston. For example, coupling member 225 could be another pair of spaced leaf spring arranged in a parallelogram or a rod, wire or bar dimensioned to couple the longitudinal displacements of the reciprocatory armature assembly 20 to the piston, but to permit slight bending in the transverse direction to accommodate the transverse displacements.

While the invention has been described with respect to several preferred embodiments, it will appreciated that these are set forth merely for purposes of example, and that many other variations, modifications and applications of the inventions may be made.

What is claimed is:

1. A reciprocatory fluid pump, comprising:
   a housing;
   an electromagnet fixed within said housing and defining an air gap;
   an armature assembly extending through said air gap and magnetically coupled to said electromagnet so as to be reciprocated thereby during the energization thereof;
   a pumping member mechanically coupled to said armature assembly so as to be reciprocated thereby;
   and a valve assembly cooperable with said pumping member, said valve assembly having an inlet port through which fluid is inletted and an outlet port through which fluid is outletted upon the reciprocation of said pumping member;
   characterized in that said armature assembly includes a ferromagnetic member and a pair of spaced permanent magnets mounted thereon for reciprocation by said electromagnet, said permanent magnets being aligned with said air gap of the electromagnet in the non-energized condition of the pump; and in that said armature assembly includes a ferromagnetic member and a pair of spaced permanent magnets mounted thereon for reciprocation by said electromagnet, said permanent magnets being aligned with a said air gap of the electromagnet in the non-energized condition of the pump; and in that said armature assembly is reciprocatably mounted to said housing by a pair of spaced leaf springs extending parallel to each other and fixed at their opposite ends to said armature assembly and housing, respectively, so as to define therewith a four-sided parallelogram in which said pair of leaf springs serve as two parallel sides, and said armature assembly and housing, respectively, serve as the other two parallel sides during reciprocations of the armature assembly.

2. The pump according to claim 1, wherein said leaf springs are of flat rectangular configuration constraining the reciprocatory movement of the armature assembly to longitudinal displacement with a small transverse displacement.

3. The pump according to claim 1, wherein said housing includes a base, and said pair of leaf springs are secured at one of their ends to said base such as to reduce sounds and vibrations during the operation of the pump.

4. The pump according to claim 3, wherein each of said pair of leaf springs is secured to the respective side of said base by a clamping bar extending across the outermost edge of the respective leaf spring.

5. The pump according to claim 3, wherein each of said pair of leaf springs is widest at its outermost edges, and is secured to the respective side of said armature assembly by a clamping bar extending across the outermost edge of the respective leaf spring.

6. The pump according to claim 1, wherein said pumping member is a diaphragm.

7. The pump according to claim 1, wherein said pumping member is a piston.

8. The pump according to claim 7, wherein said piston is mechanically coupled to the armature assembly by a stiff member having some elasticity permitting some transverse displacement of the piston.

9. The pump according to claim 1, wherein said pumping member and a second pumping member are coupled to each of the opposite ends of said armature assembly, and said valve assembly and a second valve assembly are cooperable with each of said pumping members.

10. The pump according to claim 9, wherein said pumping members are diaphragms.

11. A reciprocatory fluid pump, comprising:
    a housing;
    an electromagnet fixed within said housing and defining an air gap;
    an armature assembly extending through said air gap and magnetically coupled to said electromagnet so as to be reciprocated thereby during the energization thereof;
    a diaphragm mechanically coupled to said armature assembly so as to be reciprocated thereby;
    and a valve assembly cooperable with said diaphragm, said valve assembly having an inlet port through which fluid is inletted and an outlet port through which fluid is outletted upon the reciprocation of said diaphragm;
    characterized in that said armature assembly includes a ferromagnetic member and a pair of spaced permanent magnets mounted thereon for reciprocation by said electromagnet, said permanent magnets being aligned with said air gap of the electromagnet in the non-energized condition of the pump; and in that said armature assembly includes a ferromagnetic member and a pair of spaced permanent magnets mounted thereon for reciprocation by said electromagnet, said permanent magnets being aligned with a said air gap of the electromagnet in the non-energized condition of the pump; and in that said armature assembly is reciprocatably mounted to said housing by a pair of spaced leaf springs extending parallel to each other and fixed at their opposite ends to said armature assembly and housing, respectively, so as to define therewith a four-sided parallelogram in which said pair of leaf springs serve as two parallel sides, and said armature assembly and housing, respectively, serve as the other two parallel sides during reciprocations of the armature assembly.

12. The pump according to claim 11, wherein said leaf springs are of flat rectangular configuration constraining the reciprocatory movement of the armature assembly to longitudinal displacement with a small transverse displacement.

13. The pump according to claim 11, wherein said housing includes a base, and said pair of leaf springs are secured at one of their ends to said base such as to reduce sounds and vibrations during the operation of the pump.

14. The pump according to claim 11, wherein said diaphragm and a second diaphragm are coupled to each of the opposite ends of said armature assembly, and said valve assembly and a second valve assembly are cooperable with each of said diaphragms.

* * * * *